United States Patent
Kim et al.

(10) Patent No.: US 11,159,300 B2
(45) Date of Patent: Oct. 26, 2021

(54) METHOD AND APPARATUS FOR TRANSMITTING AND RECEIVING DOWNLINK CONTROL SIGNAL IN WIRELESS COMMUNICATION SYSTEM

(71) Applicant: Samsung Electronics Co., Ltd., Suwon-si (KR)

(72) Inventors: Taehyoung Kim, Seoul (KR); Youngbum Kim, Seoul (KR); Jinyoung Oh, Seoul (KR); Seunghoon Choi, Seongnam-si (KR); Heedon Gha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/645,262

(22) PCT Filed: Sep. 21, 2018

(86) PCT No.: PCT/KR2018/011244
§ 371 (c)(1),
(2) Date: Mar. 6, 2020

(87) PCT Pub. No.: WO2019/066407
PCT Pub. Date: Apr. 4, 2019

(65) Prior Publication Data
US 2020/0220703 A1      Jul. 9, 2020

(30) Foreign Application Priority Data
Sep. 29, 2017  (KR) .................. 10-2017-0126894

(51) Int. Cl.
*H04L 5/10*          (2006.01)
*H04L 5/00*          (2006.01)
(Continued)

(52) U.S. Cl.
CPC ............ *H04L 5/10* (2013.01); *H04L 1/0038* (2013.01); *H04L 5/0051* (2013.01); *H04W 72/0493* (2013.01)

(58) Field of Classification Search
None
See application file for complete search history.

(56) References Cited

U.S. PATENT DOCUMENTS

2013/0157660 A1   6/2013  Awad et al.
2013/0294366 A1*  11/2013  Papasakellariou .......................... H04L 25/0204
                                                                   370/329
(Continued)

OTHER PUBLICATIONS

ZTE etc.,'CORESET configuration and Search space for NR-PDCCH',R1-1715519, 3GPP TSG RAN WG1, Meeting NR#3, Nagoya, Japan Section 1-3.3, Sep. 12, 2017.
(Continued)

*Primary Examiner* — Peter Chen
*Assistant Examiner* — Jeff Banthrongsack
(74) *Attorney, Agent, or Firm* — Jefferson IP Law, LLP

(57) ABSTRACT

The present disclosure relates to a communication technique for fusing a 5G communication system to support a higher data rate than a 4G system with IoT technology; and a system thereof. In embodiments according to the disclosure provide an improved method for transmitting and receiving a control channel. A method performed by a base station according to disclosed aspects includes: transmitting first control area setting information containing first demodulation reference signal (DMRS) setting information for a first control area, transmitting second control area setting information containing second DMRS setting information for a second control area, identifying a third control area where the first control area overlaps with the second control area, and transmitting a DMRS on the basis of the first DMRS
(Continued)

configuration information in the first control area including the third control area. A corresponding method performed by a terminal, a base station and a terminal are also described.

12 Claims, 9 Drawing Sheets

(51) Int. Cl.
*H04L 1/00* (2006.01)
*H04W 72/04* (2009.01)

(56) References Cited

U.S. PATENT DOCUMENTS

2016/0366670 A1* 12/2016 Feng .................... H04L 27/362
2017/0230947 A1 8/2017 Liu et al.
2019/0089486 A1 3/2019 Kim et al.

OTHER PUBLICATIONS

ZTE etc.,'Remaining issues of PDCCH DMRS and PDCCH interleaving', R1-1715556, 3GPP TSG RAN WG1, Meeting NR#3, Nagoya, Japan Section 1-3, Sep. 12, 2017.
LG Electronics, 'Discussion on search space design', R1-1715871, 3GPP TSG RAN WG1, Meeting NR#3, Nagoya, Japan Section 1-2.5, Sep. 12, 2017.

* cited by examiner

METHOD AND APPARATUS FOR TRANSMITTING AND RECEIVING DOWNLINK CONTROL SIGNAL IN WIRELESS COMMUNICATION SYSTEM

TECHNICAL FIELD

The disclosure relates to a method and an apparatus for transmitting or receiving a downlink control channel in a wireless communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

DISCLOSURE OF INVENTION

Technical Problem

In order to achieve technical tasks of the disclosure, an embodiment provides an improved method for transmitting or receiving a control channel. Further, in order to achieve technical tasks of the disclosure, an embodiment provides an improved method for transmitting or receiving a downlink control channel.

Solution to Problem

In accordance with an aspect of the disclosure, an operating method of a base station may include: transmitting first control resource set configuration information including first demodulation reference signal (DMRS) configuration information for a first control resource set; transmitting second control resource set configuration information including second DMRS configuration information for a second control resource set; identifying a third control resource set in which the first control resource set and the second control resource set overlap each other; and transmitting a DMRS based on the first DMRS configuration information in the first control resource set including the third control resource set.

In accordance with another aspect of the disclosure, an operating method of a terminal may include: receiving, from a base station, first control resource set configuration information including first demodulation reference signal (DMRS) configuration information for a first control resource set; receiving, from the base station, second control resource set configuration information including second DMRS configuration information for a second control resource set; identifying a third control resource set, in which the first control resource set and the second control resource set overlap each other, based on the first control resource set configuration information and the second control resource set configuration information; and receiving a DMRS based on the first DMRS configuration information in the first control resource set including the third control resource set.

In accordance with still another aspect of the disclosure, a base station may include a transceiver configured to transmit and receive signals, and a controller configured to control to: transmit first control resource set configuration information including first demodulation reference signal (DMRS) configuration information for a first control resource set; transmit second control resource set configuration information including second DMRS configuration information for a second control resource set; identify a third control resource set in which the first control resource set and the second control resource set overlap each other; and transmit a DMRS based on the first DMRS configuration information in the first control resource set including the third control resource set.

In accordance with yet another aspect of the disclosure, a terminal may include a transceiver configured to transmit and receive signals, and a controller configured to control to: receive, from a base station, first control resource set configuration information including first demodulation reference signal (DMRS) configuration information for a first control resource set; receive, from the base station, second control resource set configuration information including second DMRS configuration information for a second control resource set; identify a third control resource set, in which the first control resource set and the second control resource set overlap each other, based on the first control resource set configuration information and the second control resource set configuration information; and receive a DMRS based on the first DMRS configuration information in the first control resource set including the third control resource set.

The technical subjects pursued in the disclosure may not be limited to the above-mentioned technical subjects, and other technical subjects which are not mentioned may be clearly understood, through the following descriptions, by those skilled in the art of the disclosure.

Advantageous Effects of Invention

Embodiments of the disclosure may provide an improved method for transmitting or receiving a control channel.

Further, in an environment in which control resource sets having different types of pieces of DMRS configuration information are configured to overlap, a method for transmitting or receiving a downlink control channel according to embodiments of the disclosure enables effective transmission of a control channel on time and frequency resources in an overlapping control resource set.

MODE FOR THE INVENTION

Figure 1:
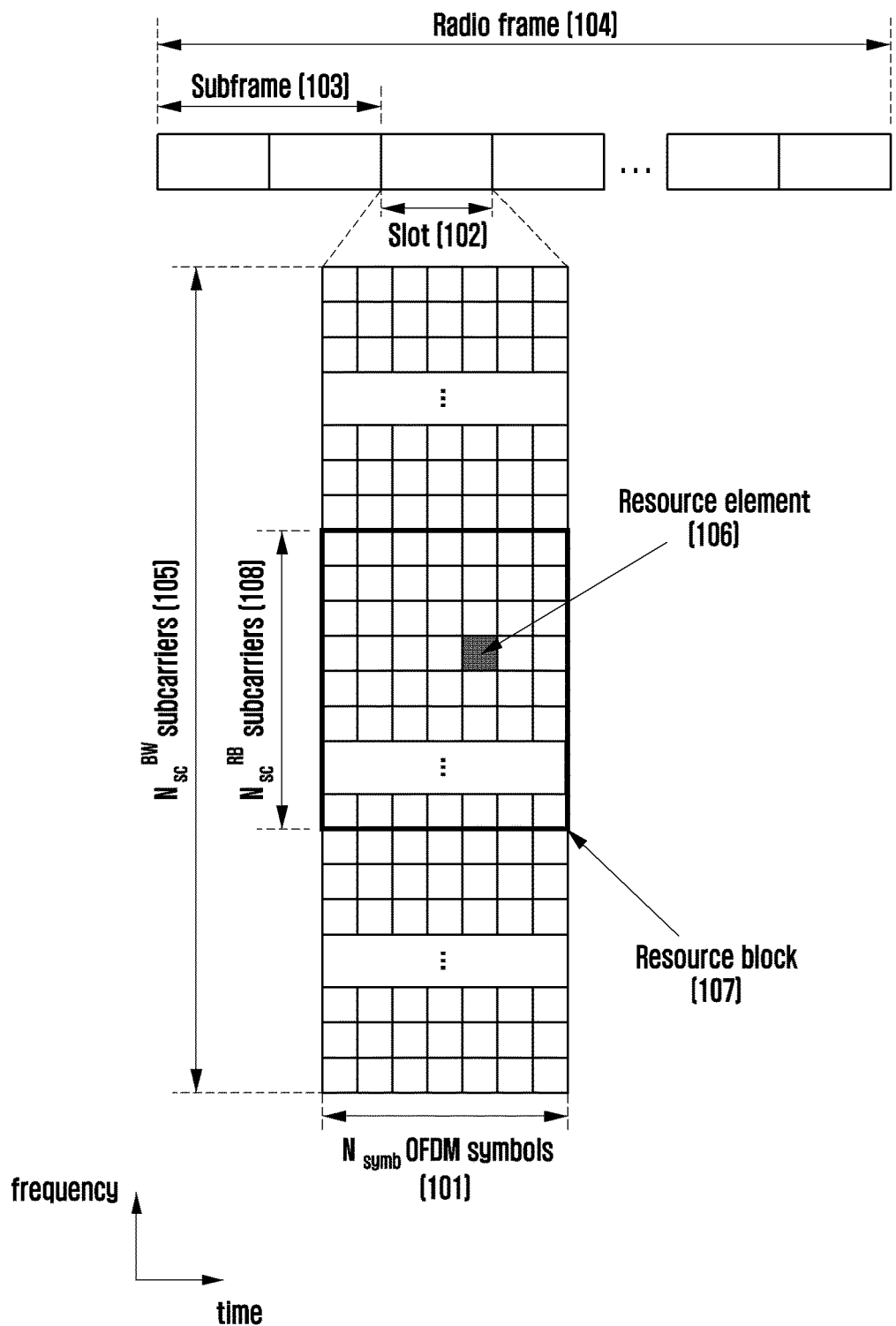
FIG. 1 is a diagram illustrating a basic structure of a time-frequency domain in LTE according to an embodiment of the disclosure.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In a description of embodiments of the disclosure, a description of technologies that are already known to those skilled in the art and are not directly relevant to the disclosure is omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, embodiments of the disclosure will be described in detail with reference to the accompanying drawings. Although embodiments of the disclosure will be described on the basis of the LTE or LTE-A system by way of example, the embodiments of the disclosure may be applied to other communication systems having similar technical backgrounds or channel types. For example, such communication systems may include 5th mobile communication systems (5G, new radio, and NR). Also, embodiments of the disclosure may be modified without departing from the scope of the disclosure, and may be applied to other communication systems, based on the determination by those skilled in the art.

Further, in the following description of the disclosure, a detailed description of known functions and configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

A wireless communication system has been developed from a wireless communication system providing a voice-centered service in the early stage toward broadband wireless communication systems providing high-speed and high-quality packet data services like communication standards such as: high-speed packet access (HSPA), long-term evolution (LTE) or evolved universal terrestrial radio access (E-UTRA), LTE-advanced (LTE-A), and LTE-Pro of 3GPP; high-rate packet data (HRPD) and ultra-mobile broadband (UMB) of 3GPP2; and 802.16e of the institute of electrical and electronics engineers (IEEE).

As a representative example of the broadband wireless communication systems, an LTE system employs an orthogonal frequency division multiplexing (OFDM) scheme for a downlink (DL), and employs a single carrier (SC)-frequency division multiple access (FDMA) scheme for an uplink (UL). The UL refers to a wireless link for transmitting data or a control signal from a terminal (e.g., a user equipment (UE) or a mobile station (MS)) to a base station (BS) (or an evolved node B (eNB)), and the DL refers to a wireless link for transmitting data or a control signal from the BS to the terminal. The above-described multiple access schemes generally distinguish between data or pieces of control information of different users by allocating and operating time-frequency resources, on which the data or pieces of control information of the users are to be transmitted, so as not to overlap each other, that is, to establish orthogonality therebetween.

As a post-LTE communication system, that is, a 5G communication system (or a new radio (NR) communication system) should be able to freely reflect various requirements of users, service providers, and the like, and thus should support services which satisfy the various requirements together. Examples of services considered for the 5G communication system include an enhanced mobile broadband (eMBB) service, a massive machine-type communication (mMTC) service, and an ultra-reliability low-latency communication (URLLC) service.

The eMBB service is aimed to provide a more enhanced data transfer rate than a data transfer rate supported by the existing LTE, LTE-A, or LTE-Pro. For example, the eMBB service in the 5G communication system should be able to provide a peak data rate of 20 gigabits per second (Gbps) for a DL and provide a peak data rate of 10 Gbps for a UL from the perspective of a single BS. Further, the 5G communication system should provide not only a peak data rate, but should also provide an increased user-perceived data rate. In order to satisfy these requirements, an improvement in various transmission/reception technologies, including a more enhanced multiple-input and multiple-output (MIMO) transmission technology, is required. Further, in the current LTE, a signal is transmitted by using a maximum of 20 megahertz (MHz) transmission bandwidth in the used 2 gigahertz (GHz) band, whereas in the 5G communication system, the data transfer rate required for the 5G communication system may be satisfied by using a frequency bandwidth wider than 20 MHz in a frequency band of 3 to 6 GHz or over 6 GHz.

In addition, the mMTC service in the 5G communication system is considered to support application services, such as Internet of things (IoT). In order to efficiently provide the IoT service, the mMTC service is required to, for example, support massive terminal access within a cell, enhance terminal coverage, increase battery time, and reduce terminal charges. The IoT service provides a communication function by using a variety of sensors attached to various devices, and thus should be able to support a large number of terminals within a cell (e.g., 1,000,000 terminals/km2). Further, since terminals supporting mMTC are highly likely to be located in a shadow zone, such as a basement of a building, which cannot be covered by a cell due to service characteristics, the mMTC service requires a wider coverage compared to other services provided by the 5G communication system. The terminals supporting mMTC need to be low-priced and are not able to have frequently-replaced batteries, and thus require very long battery life times, such as 10 to 15 years.

Lastly, the URLLC service is a mission-critical cellular-based wireless communication service. For example, services used for remote control of robots or machinery, industrial automation, unmanned aerial vehicles, remote healthcare, and emergency alert may be considered for URLLC. Therefore, communication provided by URLLC should provide ultra-low latency and ultra-high reliability. For example, the service supporting URLLC should satisfy an air interface latency less than 0.5 millisecond (ms) and, at the same time, has a requirement of a packet error rate equal to or less than $10^{-5}$. Therefore, for the service supporting URLLC, the 5G system should provide a smaller transmit time interval (TTI) compared to other services and, at the same time, requires a design in which wide resources should be allocated in a frequency band in order to ensure the reliability of a communication link.

The three services of 5G, that is, eMBB, URLLC, and mMTC, may be multiplexed and transmitted in one system.

In this example, in order to satisfy different requirements that the respective services have, it is possible to use different transmission/reception techniques and transmission/reception parameters for the respective services.

In 5G, either a wideband DMRS (WB-RS) or a narrowband DMRS (NB-RS) may be configured as a DMRS for decoding of a DL control channel. In this configuration, when a control resource set (CORESET) configured as an NB-RS and a CORESET configured as a WB-RS overlap entirely or partially, there may occur a problem of an assumption of DMRS configuration necessary to decode a DL control channel in an overlapping region. In order to solve this problem, embodiments of the disclosure propose methods, including an assumption of a WB-RS, a rate matching of a CORESET, skipping of monitoring of a CORESET, and the like.

In 5G, one or more CORESETs may be configured for a terminal by a BS. Whether which type of search space is to be monitored in each CORESET may be configured for the terminal by the BS. That is, the terminal may be configured by the BS to monitor various types of common search spaces and UE-specific search spaces. The disclosure proposes embodiments corresponding to various configuration methods which allow configuration of a CORESET and monitoring of a search space.

Hereinafter, frame structures of an LTE system and an LTE-A system will be described more specifically with reference to the drawings.

FIG. 1 is a diagram illustrating a basic structure of a time-frequency domain which is a wireless resource region for transmission of the data or control channel for a DL in an LTE system according to an embodiment of the disclosure.

In FIG. 1, a horizontal axis represents a time domain and a vertical axis represents a frequency domain. In the time domain, the minimum transmission unit is an OFDM symbol, and Nsymb 101 OFDM symbols are gathered to constitute one slot 102, and two slots are gathered to constitute one subframe 103. The length of the slot is 0.5 ms, and the length of the subframe is 0.1 ms. Further, a radio frame 104 is a time domain unit including 10 subframes. In the frequency domain, the minimum transmission unit is a subcarrier, and a bandwidth of an entire system transmission band includes a total of NBW subcarriers 105. In the time-frequency domain, a basic unit of a resource is a resource element (RE) 106, and may be indicated by an OFDM symbol index and a subcarrier index. An RB or a physical resource block (PRB) 107 is defined by Nsymb consecutive OFDM symbols 101 in the time domain and NRB consecutive subcarriers 108 in the frequency domain. Accordingly, one RB 108 includes Nsymb x NRB REs 106. Generally, the minimum transmission unit of data is an RB unit. In the LTE system, generally, Nsymb=7, NRB=12, and NBW and NRB are proportional to the bandwidth of the system transmission band.

Next, DL control information (DCI) in an LTE system and an LTE-A system will be described in detail.

In the LTE system, scheduling information of DL data or UL data is delivered from a BS to a terminal via DCI. For DCI, various formats are defined, and a determined DCI format is applied and operated according to whether the DCI is scheduling information of UL data or scheduling information of DL data, whether the DCI is compact DCI having control information of a small size, whether the DCI applies spatial multiplexing using multiple antennas, whether the DCI is DCI for power control, and the like. For example, DCI format 1, which is scheduling control information of DL data, is configured to include at least the following pieces of control information.

Resource allocation type 0/1 flag: This notifies whether a resource allocation scheme is of type 0 or type 1. Type 0 applies a bitmap scheme so as to allocate a resource in a resource block group (RBG) unit. In the LTE system, a basic unit of scheduling is an RB expressed as a time and frequency domain resource, and the RBG includes multiple RBs so as to be a basic unit of scheduling in a type 0 scheme. Type 1 allocates a particular RB in the RBG.

Resource block assignment: This notifies of an RB allocated for data transmission. An expressed resource is determined according to a system bandwidth and a resource allocation scheme.

Modulation and coding scheme (MCS): This notifies of a modulation scheme used for data transmission and the size of a transport block (TB) which is data desired to be transmitted.

HARQ process number: This notifies of a process number of a HARQ.

New data indicator: This notifies whether HARQ transmission is initial transmission or retransmission.

Redundancy version: This notifies of a redundancy version of a HARQ.

Transmit power control (TPC) command for a physical uplink control channel (PUCCH): This notifies of a transmission power control command for a PUCCH which is a UL control channel.

The DCI passes through a channel coding and modulation process and is transmitted via a PDCCH or an enhanced PDCCH (EPDCCH) which is a DL physical control channel.

A cyclic redundancy check (CRC) is attached to a payload of a DCI message, and the CRC is scrambled with a radio network temporary identifier (RNTI) corresponding to an identity of a terminal. Different RNTIs are used depending on the purpose of the DCI message (e.g., UE-specific data transmission, power control command, or random access response). That is, the RNTI is not explicitly transmitted but is transmitted in a state of being included in a CRC calculation process. Upon receiving a DCI message transmitted on a PDCCH, the terminal checks a CRC by using the allocated RNTI. If the check result of the CRC is correct, the terminal may recognize that the relevant message is transmitted to the terminal.

Figure 2:
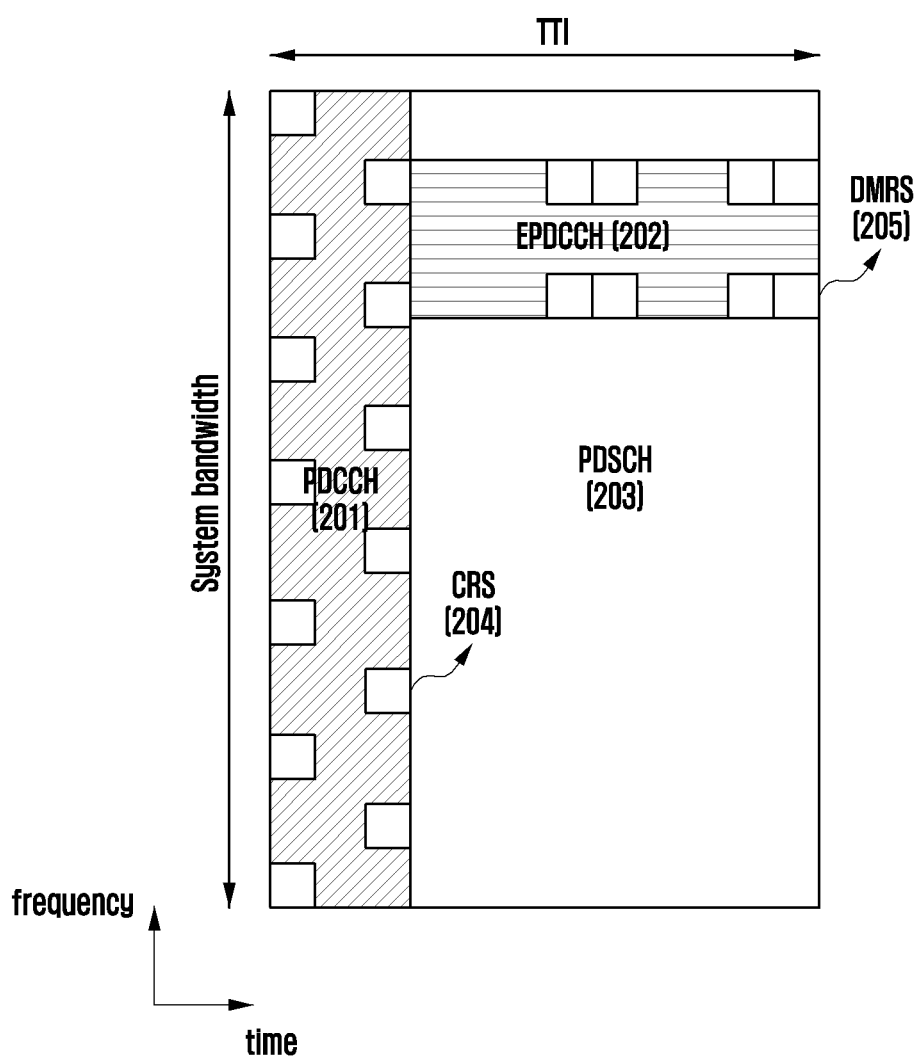
FIG. 2 is a diagram illustrating a downlink control channel of LTE according to an embodiment of the disclosure.

FIG. 2 is a diagram illustrating a PDCCH 201 and an enhanced PDCCH (EPDCCH) 202 which are DL physical control channels for transmission of DCI of LTE according to an embodiment of the disclosure.

Referring to FIG. 2, the PDCCH 201 is time-multiplexed with a physical downlink shared channel (PDSCH) 203, which is a data transmission channel, and is transmitted in an entire system bandwidth. A region of the PDCCH 201 is represented by the number of OFDM symbols, and is indicated to a terminal by a control format indicator (CFI), transmitted via a physical control format indicator channel (PCFICH). The PDCCH 201 is allocated to an OFDM symbol located at a front part of a subframe so that the terminal can decode allocation of DL scheduling as quickly as possible, and through this configuration, a decoding latency for a downlink shared channel (DL-SCH), that is, an overall DL transmission latency, can be reduced. Since one PDCCH carries one DCI message and multiple terminals are simultaneously scheduled in a DL and a UL, multiple PDCCHs are simultaneously transmitted in each cell. A cell-specific reference signal (CRS) 204 is used as a reference signal for decoding of the PDCCH 201. The CRS 204 is transmitted in every subframe over the entire band, and scrambling and resource mapping vary according to a cell identity (ID). The CRS 204 is a reference signal commonly used by all terminals, and thus may not be used for UE-specific beamforming. Accordingly, a multiple-antenna transmission technique for a PDCCH of LTE is limited to open-loop transmission diversity. The number of ports of the CRS is implicitly known to the terminal from decoding of a physical broadcast channel (PBCH).

The allocation of resources of the PDCCH 201 is based on a control-channel element (CCE), and one CCE includes nine resource element groups (REGs), that is, a total of 36 resource elements (REs). The number of CCEs necessary for a particular PDCCH 201 may be 1, 2, 4, or 8, and varies depending on a channel coding rate of a DCI message payload. As described above, the different numbers of CCEs are used to implement link adaptation of the PDCCH 201. The terminal should detect a signal in the state in which the terminal does not know information on the PDCCH 201, and LTE defines a search space representing a set of CCEs for blinding-decoding. Multiple sets of the search spaces are configured at an aggregation level (AL) of each CCE, and the search space is not explicitly signaled but is implicitly defined through a function of a terminal ID and a subframe number. In each subframe, the terminal decodes the PDCCH 201 for all possible resource candidates that may be generated from CCEs in a configured search space, and processes information declared to be valid for the corresponding terminal through identifying of a CRC.

The search spaces are classified into a UE-specific search space and a common search space. Terminals of a specific group or all terminals may search a common search space of the PDCCH 201 in order to receive cell-common control information such as dynamic scheduling for system information or a paging message. For example, scheduling allocation information of a DL-SCH for transmission of system information block (SIB)-1 including operator information of a cell and the like may be received by searching the common search space of the PDCCH 201.

Referring to FIG. 2, the EPDCCH 202 is transmitted by being frequency-multiplexed with the PDSCH 203. A BS may appropriately allocate the resources of the EPDCCH 202 and the PDSCH 203 through scheduling, and thus, may effectively support coexistence with data transmission for an existing LTE terminal. However, since the EPDCCH 202 is transmitted by being allocated to the entire one subframe on the time axis, a problem exists in that there is a loss from the perspective of a transmission latency time. Multiple EPDCCHs 202 constitute one EPDCCH (202) set, and the EPDCCH (202) set is allocated in units of physical resource block (PRB) pair. Location information of the EPDCCH set is UE-specifically configured, and is signaled via radio resource control (RRC). A maximum of two EPDCCH (202) sets may be configured for each terminal, and one EPDCCH (202) set may be simultaneously multiplexed and configured in different terminals.

The allocation of the resource of the EPDCCH 202 is based on an enhanced CCE (ECCE), one ECCE may include four or eight enhanced REGs (EREGs), and the number of EREGs per ECCE varies depending on the length of a cyclic prefix (CP) and subframe configuration information. One EREG includes nine REs, and thus sixteen EREGs may exist per PRB pair. An EPDCCH transmission scheme is classified into localized transmission and distributed transmission according to a RE mapping scheme of an EREG. The aggregation level of an ECCE may be 1, 2, 4, 8, 16, or 32, and is determined based on the length of a CP, configuration of a subframe, an EPDCCH format, and a transmission scheme.

The EPDCCH 202 supports only a UE-specific search space. Accordingly, the terminal which is to receive a system message necessarily should search a common search space of the existing PDCCH 201.

In the EPDCCH 202, a demodulation reference signal (DMRS) 205 is used as a reference signal for decoding. Accordingly, precoding for the EPDCCH 202 may be configured by the BS, and UE-specific beamforming may be used. The terminals may decode the EPDCCH 202 by using the DMRS 205 even when the terminals do not know which precoding is used. The EPDCCH 202 uses the same pattern as a DMRS of the PDSCH 203. However, unlike the PDSCH 203, the DMRS 205 of the EPDCCH 202 may support transmission using a maximum of four antenna ports. The DMRS 205 is transmitted only in a corresponding PRB, in which the EPDCCH is transmitted.

Port configuration information of the DMRS 205 varies depending on a transmission scheme of the EPDCCH 202. In the localized transmission scheme, an antenna port corresponding to an ECCE, to which the EPDCCH 202 is mapped, is selected based on the ID of the terminal. When different terminals share the same ECCE, that is, when multi-user MIMO transmission is used, a DMRS antenna port may be allocated to the terminals. Alternatively, the DMRS 205 may be shared and transmitted, and in this example, the transmission may be identified by a DMRS (205) scrambling sequence configured via higher-layer signaling. The distributed transmission scheme supports up to two antennal ports of the DMRS 205, and supports a diversity technique of a precoder cycling scheme. The DMRS 205 may be shared for all REs transmitted in one PRB pair.

In LTE, an entire PDCCH region includes a set of CCEs in a logical region, and includes a search space including a set of CCEs. The search space is divided into a common search space and a UE-specific search space, and a search space of an LTE PDCCH is defined as below.

---

PDCCH Search Space

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by
$L\{(Y_k + m') \bmod \lfloor N_{CCE,k}/L \rfloor\} + i$
where $Y_k$ is defined below, $i = 0, \ldots, L - 1$. For the common search space $m' = m$. For the PDCCH UE-specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where -continued PDCCH Search Space m = 0, ..., $M^{(L)}$ − 1. $M^{(L)}$ is the number of PDCCH candidates to monitor in the given search space.
Note that the carrier indicator field value is the same as ServCellIndex.
For the common search spaces, $Y_k$ is set to 0 for the two aggregation levels L = 4 and L = 8.
For the UE-specific search space $S_k^{(L)}$ at aggregation level L, the variable $Y_k$ is defined by
$Y_k = (A \cdot Y_{k-1}) \bmod D$
where $Y_{-1} = n_{RNTI} \neq 0$, A = 39827, D = 65537 and k = $\lfloor n_s/2 \rfloor$, $n_s$ is the slot number within a radio frame.
The RNTI value used for $n_{RNTI}$ is defined in subclause 7.1 in downlink and subclause 8 in uplink.

According to the above-described definition of the search space of the PDCCH, the UE-specific search space is not explicitly signaled but is implicitly defined through a function of a terminal ID and a subframe number. In other words, since the UE-specific search space may vary depending on a subframe number, this implies that the UE-specific search space may vary over time, and this configuration solves a problem in which, among terminals, a particular terminal fails to use a search space due to other terminals (which is defined as a blocking problem). If all CCEs searched by a particular terminal are already used by other terminals scheduled in the same subframe and, accordingly, the particular terminal fails to be scheduled in the corresponding subframe, this search space varies over time, and thus such a problem may not occur in a next subframe. For example, even when UE-specific search spaces of a terminal #1 and a terminal #2 partially overlap in a particular subframe, the UE-specific search space varies for each subframe, and thus an overlap in a next subframe may be expected to be different from the above-described overlap.

According to the above-described definition of the search space of the PDCCH, in the common search space, terminals of a specific group or all terminals should receive the PDCCH, and thus the common search space is defined as a set of previously agreed-upon CCEs. In other words, the common search space does not vary depending on an ID of a terminal, a subframe number, or the like. The common search space exists for transmission of various system messages, but may also be used to transmit control information of an individual terminal. Through this configuration, the common search space may also be used as a solution for a phenomenon in which a terminal fails to be scheduled due to a shortage of resources available in a UE-specific search space.

Since a search space is a set of candidate control channels including CCEs that a terminal should attempt to decode at a given aggregation level and has various aggregation levels at which one group is generated from 1, 2, 4, or 8 CCEs, the terminal has multiple search spaces. The number of PDCCH candidates that a terminal should monitor in a search space defined based on an aggregation level in an LTE PDCCH is defined in Table 1 below.

TABLE 1

| Search space $S_k^{(L)}$ | | | Number of |
|---|---|---|---|
| Type | Aggregation level L | Size [in CCEs] | PDCCH candidates $M^{(L)}$ |
| UE-specific | 1 | 6 | 6 |
| | 2 | 12 | 6 |

TABLE 1-continued

| Search space $S_k^{(L)}$ | | | Number of |
|---|---|---|---|
| Type | Aggregation level L | Size [in CCEs] | PDCCH candidates $M^{(L)}$ |
| | 4 | 8 | 2 |
| | 8 | 16 | 2 |
| Common | 4 | 16 | 4 |
| | 8 | 16 | 2 |

Referring to Table 1, a UE-specific search space supports an aggregation level {1, 2, 4, 8}, and in this example, has {6, 6, 2, 2} PDCCH candidates, respectively. A common search space supports an aggregation level {4, 8}, and in this example, has {4, 2} PDCCH candidates, respectively. The reason why the common search space supports only the aggregation level {4, 8} is to improve coverage characteristics since a system message should generally be delivered to a cell edge.

DCI transmitted in the common search space is defined for only a particular DCI format, such as 0/1A/3/3A/1C, which corresponds to a purpose of a system message, power control of a terminal group, or the like. A DCI format having spatial multiplexing is not supported in the common search space. In the UE-specific search space, a DL DCI format, which needs to be decoded, varies depending on a transmission mode configured for a corresponding terminal. The transmission mode is configured via RRC signaling, and thus an accurate subframe number as to whether the corresponding configuration is effective for the corresponding terminal is not designated. Therefore, the terminal may always perform decoding in relation to the DCI format 1A regardless of a transmission mode, and thus may operate not to lose communication.

Hereinabove, the description has been made of the method for transmitting or receiving a DL control channel and DL control information and the search space in LTE and LTE-A.

Hereinafter, a DL control channel in a 5G communication system currently being discussed will be described in more detail with reference to the drawings.

Figure 3:
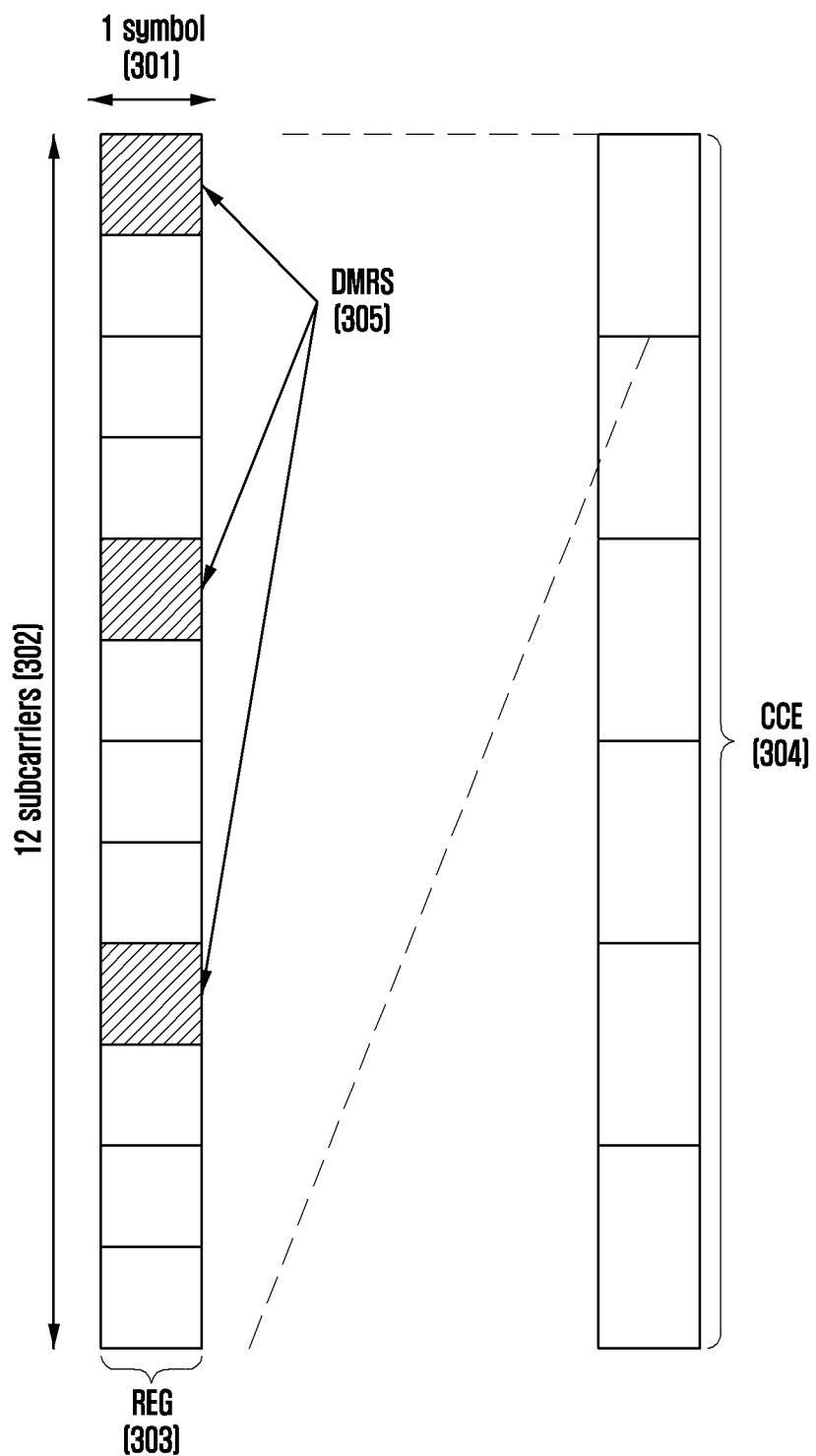
FIG. 3 is a diagram illustrating transmission resources of a downlink control channel in 5G according to an embodiment of the disclosure.

FIG. 3 is a diagram illustrating an example of a basic unit of time and frequency resources constituting a DL control channel which may be used in 5G according to an embodiment of the disclosure.

Referring to FIG. 3, a basic unit (REG) of time and frequency resources constituting a control channel includes one OFDM symbol 301 on a time axis and 12 subcarriers 302, that is, one RB, on a frequency axis. In configuring the basic unit of the control channel, the basic unit on the time axis is assumed to be one OFDM symbol 301, and thus a data channel and a control channel may be time-multiplexed in one subframe. The processing time of a user may be reduced by placing a control channel before a data channel, and thus it is easy to satisfy a latency time requirement. Frequency-multiplexing between a control channel and a data channel can be more efficiently performed by configuring the frequency-axis basic unit of the control channel so as to be the one RB 302.

Control channel regions of various sizes may be configured by concatenating REGs 303 illustrated in FIG. 3. As an example, when a basic unit, in which a DL control channel is allocated in 5G, is a CCE 304, one CCE 304 may include multiple REGs 303. The CCE 304 illustrated in FIG. 3 is described by way of example. The REG 303 may include 12 REs, and if one CCE 304 includes six REGs 303, this implies that the one CCE 304 includes 72 REs. If a DL CORESET is configured, the corresponding CORESET may include multiple CCEs 304. A particular DL control channel may be transmitted by being mapped to one or more CCEs 304 according to aggregation levels (ALs) in the CORESET. The CCEs 304 in the CORESET may be distinguished by numbers, and in this example, the numbers may be assigned according to a logical mapping scheme.

The basic unit (i.e., the REG 303) of the DL control channel illustrated in FIG. 3 may include all of: REs to which DCI is mapped; and a region to which a DMRS 305, which is a reference signal for decoding of the REG 303, is mapped. As illustrated in FIG. 3, three DMRSs 305 may be transmitted on one REG 303.

Figure 4:
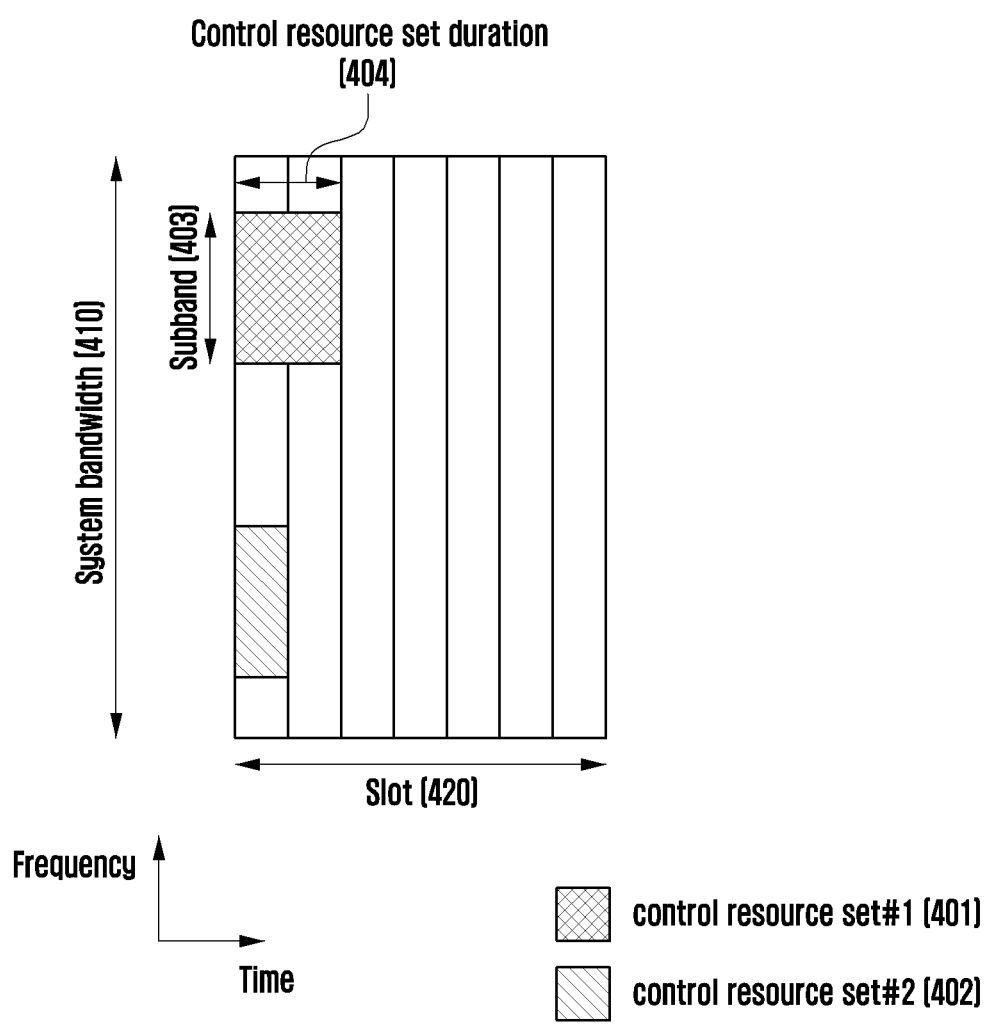
FIG. 4 is a diagram illustrating an example of configuration of a control resource set in 5G according to an embodiment of the disclosure.

FIG. 4 is a diagram illustrating an example of a CORESET in which a DL control channel is transmitted in a 5G wireless communication system according to an embodiment of the disclosure.

FIG. 4 illustrates an example in which a system bandwidth 410 on a frequency axis and two CORESETs (CORESET #1 401 and CORESET #2 402) in one slot 420 (one slot is assumed to be seven OFDM symbols in the example of FIG. 4, and the number of OFDM symbols included in one slot is not limited thereto) on a time axis are configured. The CORESETs 401 and 402 may be configured as a particular subband 403 in the entire system bandwidth 410 on the frequency axis. The CORESETs 401 and 402 may be configured as one or more OFDM symbols on the time axis, which may be defined as a control resource set duration 404. In the example of FIG. 4, the CORESET #1 401 is configured as a control resource set duration of two symbols, and the CORESET #2 402 is configured as a control resource set duration of one symbol.

The above-described CORESET in 5G may be configured for a terminal by a BS via higher-layer signaling (e.g., system information, a master information block (MIB), or radio resource control (RRC) signaling). Configuration of a CORESET for a terminal implies provision of at least one piece of information among information on the location of the CORESET, information on a subband, information on resource allocation of the CORESET, information on a control resource set duration, and the like. For example, the following pieces of information.

TABLE 2

Configuration information 1. Frequency-axis RB allocation information
Configuration information 2. CORESET start symbol
Configuration information 3. CORESET symbol length
Configuration information 4. REG bundling size
Configuration information 5. Transmission mode (Interleaved transmission scheme or Non-interleaved transmission scheme)

TABLE 2-continued

Configuration information 6. DMRS configuration information
Configuration information 7. Search space type (common search space, group-common search space, and UE-specific search space)
Configuration information 8. Monitoring periodicity
Other pieces of information In addition to the above-described pieces of configuration information, various pieces of information necessary to transmit the DL control channel may be configured for a terminal, and some pieces of information among the pieces of information in Table 2 may be configured for the terminal. The pieces of information in Table 2 may be transmitted by being included in one message, or some pieces of information among the pieces of information in Table 2 may be transmitted by being included in at least one message among SIB, MIB, and RRC.

Figure 5:
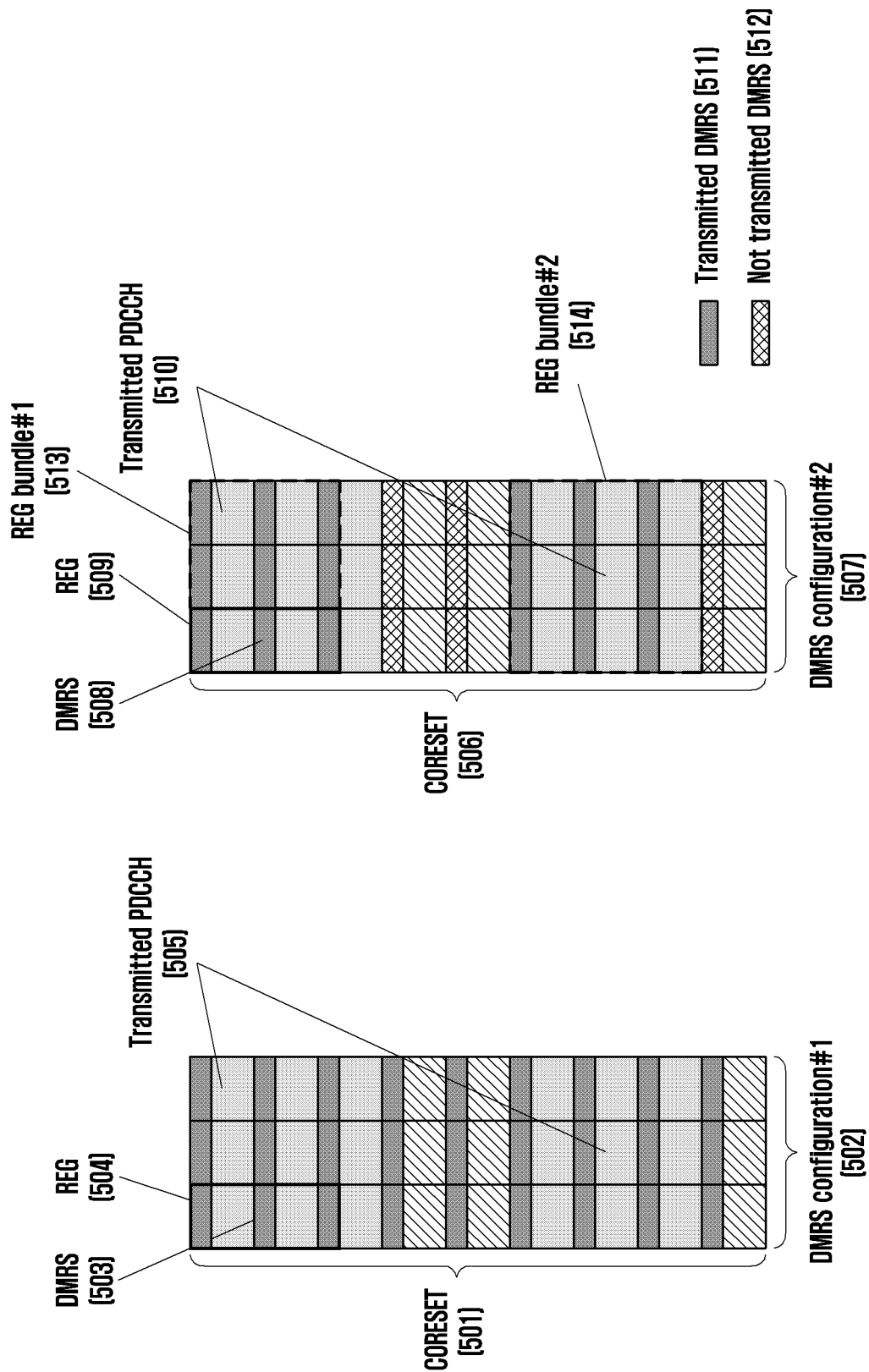
FIG. 5 is a diagram illustrating a method for transmitting a DMRS for a downlink control channel in 5G according to an embodiment of the disclosure.

FIG. 5 is a diagram illustrating an example of configuration of a DMRS for a DL control channel in a 5G wireless communication system according to an embodiment of the disclosure.

In 5G, a CORESET may be configured using the following two methods.

[DMRS Configuration #1]

Configuration of a CORESET as a DMRS configuration #1 may imply that DMRSs, to which the same precoding has been applied in relation to all contiguous RBs in the CORESET, are transmitted by being mapped to all REGs in the relevant CORESET. This configuration may be referred to as a "WB-RS".

In the example of FIG. 5, a CORESET 501 is illustrated as being configured as the DMRS configuration #1 502. A DMRS 503 may be transmitted on all REGs 504 in the CORESET 501. In this example, the DMRS 503 may be transmitted even on a REG 504 to which a transmitted PDCCH 504 is not mapped. Further, the same precoding may be applied to all the transmitted DMRSs 503.

A terminal, which monitors the CORESET 501 configured as the DMRS configuration #1 502, may perform channel estimation for the CORESET 501, assuming that the same precoding is applied to the DMRSs 503 transmitted on all the REGs 504 in the relevant CORESET 501, and may blind-decode a PDCCH 505 based on the estimated channel information.

[DMRS Configuration #2]

Configuration of a CORESET as a DMRS configuration #2 may imply that DMRSs to which the same precoding has been applied in a pre-configured REG bundle unit are transmitted by being mapped to a REG on which a PDCCH is actually transmitted. This configuration may be referred to as an "NB-RS".

In the example of FIG. 5, a CORESET 506 is illustrated as being configured as the DMRS configuration #2 507. A DMRS 508 may be transmitted on a REG 509 on which a PDCCH 510 is actually transmitted in the CORESET 506. Accordingly, an actually-transmitted DMRS 511 and a DMRS 512 which is not transmitted may exist in the CORESET 506, depending on whether the PDCCH 510 is transmitted. Further, the same precoding may be applied to the transmitted DMRS 511 in a REG bundle. For example, in FIG. 5, if one transmission PDCCH 510 includes two REG bundles, that is, a REG bundle #1 513 and a REG bundle #2 514, the same precoding may be applied to all DMRSs 511 transmitted on the REG bundle #1 513, and the same precoding may be applied to all DMRSs 511 transmitted on the REG bundle #2 514. The size of a REG bundle is a part of the configuration of the CORESET 506, and may be configured for a terminal by a BS.

A terminal, which monitors the CORESET 506 configured as the DMRS configuration #2 507, may perform channel estimation, assuming that the same precoding is applied to DMRSs transmitted in a configured REG bundle unit, and may blind-decode the PDCCH 510 based on the estimated channel information.

A resource mapping scheme (e.g., a CCE-to-REG mapping scheme) for a 5G DL control channel may include a non-interleaving scheme and an interleaving scheme. The non-interleaving mapping scheme may be a mapping scheme in which multiple contiguous REGs constitute one CCE, and the interleaving mapping scheme may be a mapping scheme in which multiple non-contiguous REGs constitute one CCE. Preferred mapping schemes may be different depending on methods for transmitting a DL control channel. As an example, a transmit diversity transmission scheme may be used for a PDCCH in order to improve reception performance, and the interleaving mapping scheme may be applied to maximize frequency diversity. Alternatively, when UE-specific beamforming is used for PDCCH transmission, the non-interleaving mapping scheme may be used to maximize a beamforming gain in a particular subband in which a PDCCH is transmitted.

Hereinafter, a method for configuring a bandwidth part (BWP) considered in a 5G communication system will be described.

Figure 6:
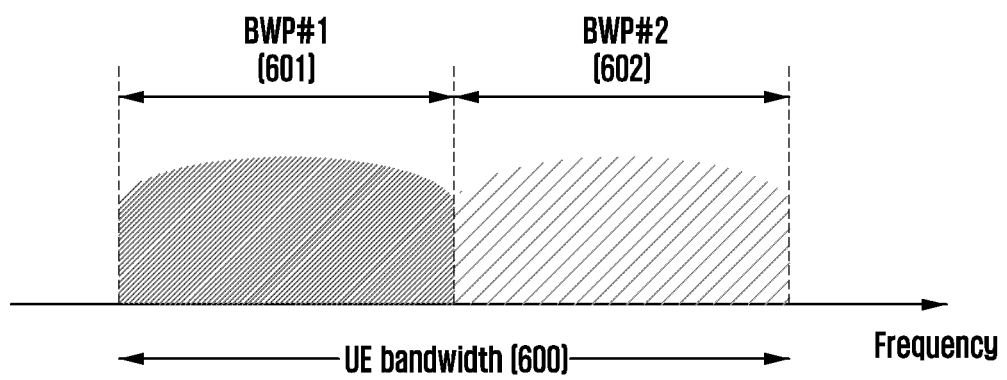
FIG. 6 is a diagram illustrating an example of configuration of a bandwidth part in 5G according to an embodiment of the disclosure.

FIG. 6 is a diagram illustrating an example of configuration of a BWP in a 5G communication system according to an embodiment of the disclosure.

FIG. 6 illustrates an example in which a UE bandwidth 600 is configured with two BWPs, that is, a BWP #1 601 and a BWP #2 602. A BS may configure one or more BWPs for a terminal, and may configure at least one piece of information among the following pieces of information for each BWP.

TABLE 3

Configuration information 1. Bandwidth of a BWP (the number of PRBs constituting the BWP)
Configuration information 2. Frequency location of a BWP (an offset value relative to a reference point, and the reference point may be, for example, a center frequency of a carrier, a synchronization signal, or a synchronization signal raster)
Configuration information 3. Numerology of a BWP (e.g., a subcarrier spacing or the length of a cyclic prefix (CP))
Other pieces of information In addition to the above-described pieces of configuration information, various parameters related to a BWP may be configured for a terminal. The above-described pieces of information may be delivered from a BS to the terminal via higher-layer signaling, for example, RRC signaling. At least one BWP among the one or more configured BWPs may be activated. Whether to activate a configured BWP may be semi-statically delivered via RRC signaling or dynamically delivered via a medium access control (MAC) control element (CE) or DCI from the BS to the terminal.

The configuration of a BWP supported by the 5G may be used for various purposes.

As an example, the configuration of a BWP may provide support for when a bandwidth supported by a terminal is smaller than a system bandwidth. For example, a BS may configure, for the terminal, the frequency location (configuration information 2) of a BWP in Table 4, and thus the terminal may transmit or receive data at a particular frequency location in the system bandwidth.

As another example, a BS may configure multiple BWPs for a terminal in order to support different numerologies. For example, in order to provide any terminal with support for both data transmission/reception using a subcarrier spacing of 15 kHz and data transmission/reception using a subcarrier spacing of 30 kHz, a BS may configure the subcarrier spacing of 15 kHz and the subcarrier spacing of 30 kHz for two BWPs, respectively. The different BWPs may be frequency-division-multiplexed, and when data is to be transmitted or received with a particular subcarrier spacing, a BWP configured as the particular subcarrier spacing may be activated.

As still another example, a BS may configure BWPs having bandwidths of different sizes for a terminal in order to reduce power consumption of the terminal. For example, if the terminal supports a very large bandwidth, for example, a bandwidth of 100 MHz, and always transmits or receives data in the corresponding bandwidth, this may cause very large power consumption. In particular, if the terminal unnecessarily monitors a DL control channel in a large bandwidth of 100 MHz in a situation where there is no traffic, this is very inefficient from the perspective of power consumption. In order to reduce power consumption of the terminal, the BS may configure a BWP having a relatively small bandwidth, for example, a BWP of 20 MHz, for the terminal. The terminal may perform a monitoring operation in the BWP of 20 MHz in a situation where there is no traffic, and when data is generated, the terminal may transmit or receive the data in a BWP of 100 MHz under the instruction of the BS.

As described above, in 5G, a DMRS for decoding of a DL control channel may be transmitted, and DMRS configuration #1 or DMRS configuration #2 may be employed according to a configuration by the BS. An assumption of different precodings is applied to DMRS configuration #1 and DMRS configuration #2, and thus the terminal may perform different decoding operations according to the respective configurations. In 5G, one or more CORESETs may be configured for a terminal, and may overlap and be allocated in time and frequency resources. In this example, when different CORESETs having different DMRS configurations overlap each other in time and frequency resources, it is necessary to determine which method is desirable for transmitting or receiving DL control information in an overlapping region. The disclosure proposes various embodiments in order to solve this problem. Embodiments of the disclosure include methods, such as an assumption of DMRS configuration #1 in an overlapping region, a rate matching of a CORESET configured as DMRS configuration #2, and skipping of monitoring of a particular CORESET.

In 5G, one or more CORESETs may be configured for a terminal by a BS. Whether which type of search space is to be monitored in each CORESET may be configured for the terminal by the BS. That is, the terminal may be configured by the BS to monitor various types of common search spaces and UE-specific search spaces. The disclosure proposes embodiments corresponding to various configuration methods which allow configuration of a CORESET and monitoring of a search space.

Embodiment 1

A BS may configure one or multiple CORESETs for a terminal, and if multiple CORESETs are configured, the multiple CORESETs may overlap each other in time and frequency resources. The respective CORESETs may have different pieces of configuration information, and may have, for example, different pieces of DMRS configuration information. Embodiment 1 of the disclosure proposes a method for transmitting or receiving a DL control channel between a BS and a terminal in an overlapping region when CORESETs having different pieces of DMRS configuration information are configured to overlap each other in a particular time/frequency domain.

Figure 7:
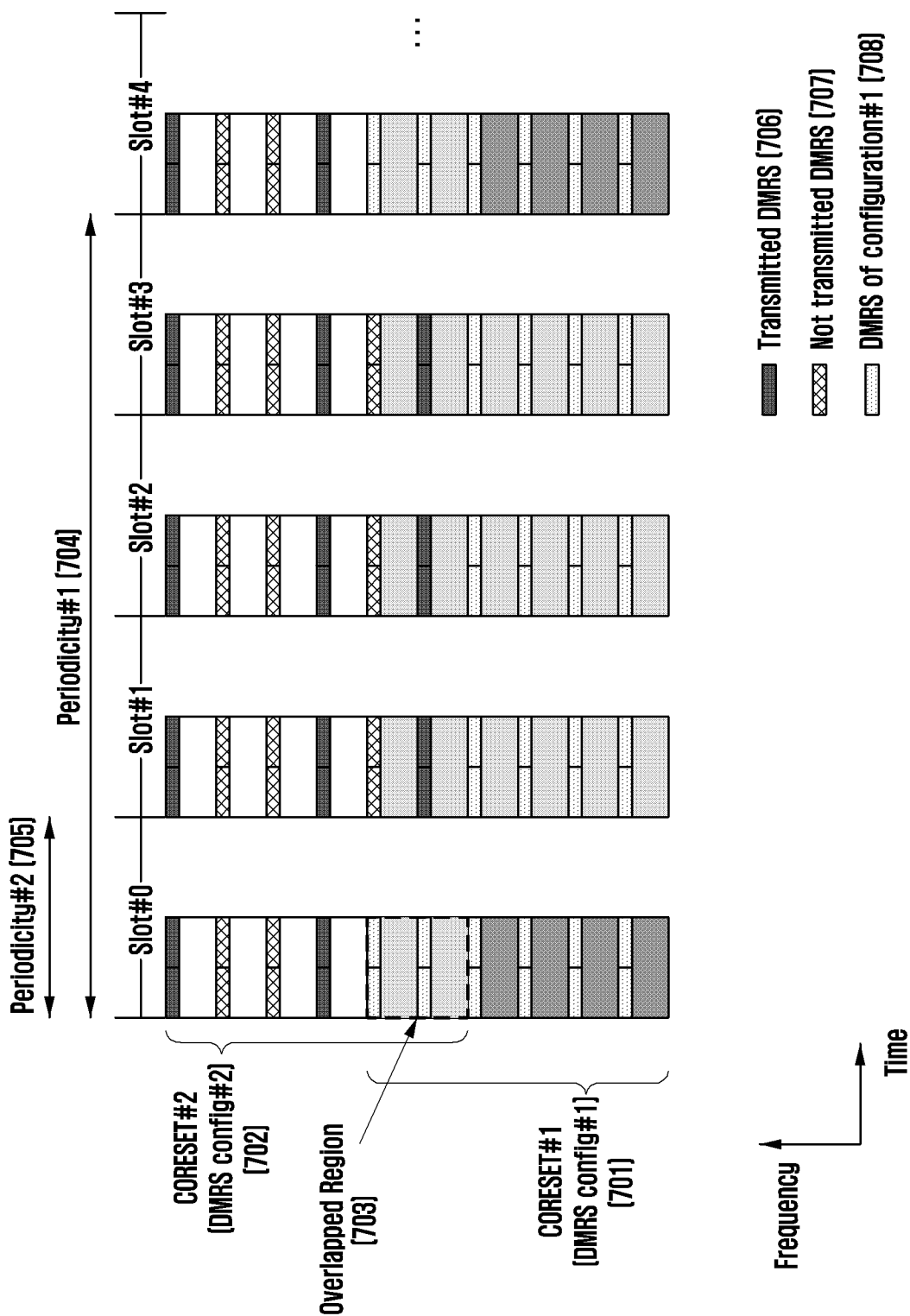
FIG. 7 is a diagram illustrating an example in accordance with Embodiment 1 according to an embodiment of the disclosure.

FIG. 7 is a diagram illustrating an example according to Embodiment 1 of the disclosure.

FIG. 7 illustrates an example in which CORESETs having different DMRS configurations are configured to overlap each other in a particular time and frequency domain. In FIG. 7, a CORESET #1 701 is configured as DMRS configuration #1. Accordingly, in the CORESET #1 701, a DMRS 708 may be transmitted on all REGs in the CORESET regardless of whether to transmit a PDCCH, and all the DMRSs, to which the same precoding is applied, may be transmitted. A CORESET #2 702 is configured as DMRS configuration #2. Accordingly, in the CORESET #2 702, the DMRS may be transmitted (as indicated by reference numeral 706) on a REG to which a PDCCH is actually mapped so as to be transmitted in the CORESET, and the DMRS may not be transmitted (as indicated by reference numeral 707) on the other REGs. In this example, the transmitted DMRS 706 may be transmitted in the state in which the same precoding is applied to the transmitted DMRS 706 in a REG bundle unit. In FIG. 7, the CORESET #1 701 and the CORESET #2 702 are configured to overlap each other, and accordingly, an overlapping region 703 may exist. Existence or non-existence of the overlapping region 703 may depend on time according to a monitoring periodicity of each of the CORESET #1 701 and the CORESET #2 702. For example, in FIG. 7, a monitoring periodicity of the CORESET #1 701 is configured as a periodicity #1 704, and a monitoring periodicity of the CORESET #2 702 is configured as a periodicity #2 705. Accordingly, in slot #0 and slot #4, the overlapping region 703 between the CORESET #1 701 and the CORESET #2 702 may exist, and in slot #1, slot #2, and slot #3, the overlapping region 703 does not exist and only the CORESET #2 702 may exist. That is, whether an overlapping region exists may vary depending on a monitoring periodicity of each CORESET, and when the overlapping region does not exist, a PDCCH may be transmitted or received in each CORESET according to the existing configuration.

When the overlapping region 703 exists, a method for transmitting a PDCCH may comply with, for example, the following methods.

In describing the following methods, a CORESET configured as DMRS configuration #1 will be referred to as a "first CORESET", and a CORESET configured as DMRS configuration #2 will be referred to as a "second CORESET". Further, a part, at which the first CORESET and the second CORESET overlap each other in a particular resource in a particular time, will be referred to as an "overlapping region". As described above, the overlapping region may exist in a particular time or an entire time according to a monitoring periodicity (or a transmission periodicity of a DMRS complying with DMRS configuration #1) of each of the first CORESET and the second CORESET.

[Method 1]

When a BS transmits a PDCCH in the overlapping region, the BS may transmit a DMRS complying with DMRS configuration #1 in the overlapping region. That is, DMRSs are transmitted on all REGs existing in the overlapping region, and the same precoding as precoding used for the first CORESET may be applied to all the DMRSs.

When a terminal blind-decodes a PDCCH in the overlapping region, the terminal may perform the blind-decoding, assuming that a DMRS complying with DMRS configuration #1 is transmitted in the overlapping region.

More specifically, when the terminal blind-decodes the first CORESET, the terminal may blind-decode an entire CORESET according to an existing scheme without considering the overlapping region. In contrast, when the terminal blind-decodes the second CORESET, the terminal may perform blind-decoding, assuming transmission of a DMRS complying with DMRS configuration #1 in an overlapping region of the second CORESET, and may perform blind-decoding, assuming DMRS configuration #2 in a region except for the overlapping region in the second CORESET.

[Method 2]

When a BS transmits a PDCCH in the overlapping region, the BS may transmit only a PDCCH complying with configuration of the first CORESET in the overlapping region, and may not transmit a PDCCH complying with configuration of the second CORESET. That is, the BS may rate-match the second CORESET in the overlapping region. The BS may transmit a PDCCH, which complies with configuration of the second CORESET, in the remaining region except for the overlapping region in the second CORESET. Examples of a method for rate-matching the second CORESET in the overlapping region may include the following two methods.

<Method 2-1>

The BS may transmit a PDCCH on the remaining PDCCH candidate except for a PDCCH candidate in a search space existing in the overlapping region in an entire search space existing in the second CORESET. More specifically, when: the entire search space includes a PDCCH candidate set {Cand #1, Cand #2, Cand #3, Cand #4}; and a PDCCH candidate set existing in the overlapping region is {Cand #1, Cand #2}, the BS may transmit a PDCCH only on the remaining PDCCH candidate set {Cand #3, Cand #4} except for the latter.

<Method 2-2>

A search space is recalculated based on a CORESET except for the overlapping region in the second CORESET, and a PDCCH may be transmitted on a PDCCH candidate existing in the newly-calculated search space. More specifically, when the second CORESET includes a total of N CCEs and the overlapping region includes a total of M CCEs, the BS may recalculate a search space based on the remaining (N-M) CCEs except for the overlapping region, and may transmit a PDCCH in the newly-calculated search space.

When the terminal monitors a PDCCH in the overlapping region, in relation to the first CORESET, the terminal may blind-decode an entire search space of the first CORESET regardless of the overlapping region.

For the second CORESET, the terminal may assume that the second CORESET has been rate-matched in the overlapping region, and then may blind-decode only the remaining region except for the overlapping region in the second CORESET. In this example, by using a method such as method 2-1 or method 2-2, the terminal may assume a search space, and then may perform blind-decoding.

[Method 3]

When an overlapping region between the first CORESET and the second CORESET exists, the BS may transmit a DMRS, which complies with DMRS configuration #1, even in the second CORESET. That is, the BS may transmit DMRSs, to which the same precoding is applied, on all REGs even in the second CORESET. In this example, the same precoding may be applied in both the first CORESET and the second CORESET.

When an overlapping region between the first CORESET and the second CORESET exists, the terminal may perform blind-decoding, assuming that a DMRS complying with DMRS configuration #1 has been transmitted even in the second CORESET. That is, the terminal may assume that DMRSs, to which the same precoding has been applied, are transmitted on all REGs even in the second CORESET, and may additionally assume that the same precoding has been applied in both the first CORESET and the second CORESET. Accordingly, the terminal may use all DMRSs existing in the first CORESET and the second CORESET during channel estimation.

[Method 4]

When an overlapping region between the first CORESET and the second CORESET exists, the BS may not transmit a PDCCH in the second CORESET.

When an overlapping region between the first CORESET and the second CORESET exists, the terminal may not blind-decode the second CORESET.

[Method 5]

Operations may be differently adjusted according to configuration information for mapping of resources of the first CORESET and the second CORESET.

As an example, when both the first CORESET and the second CORESET are configured according to an interleaving mapping scheme and the above-described overlapping region exists, the BS may transmit or receive a PDCCH to/from the terminal in each CORESET by using at least one method among the above-described method 1, method 2, method 3, and method 4.

As another example, when the first CORESET is configured according to an interleaving scheme, the second CORESET is configured according to a non-interleaving scheme, and the above-described overlapping region exists, the BS may transmit or receive a PDCCH to/from the terminal in each CORESET by using at least one method among the above-described method 2 and method 4.

Hereinabove, method 1 to method 5 have been separately described, but some of method 1 to method 5 may be combined and practiced.

Hereinabove, only an example in which two CORESETs overlap each other has been described, but the disclosure may also be similarly applied to an example in which multiple CORESETs overlap one another.

Embodiment 1-1

Embodiment 1-1 of the disclosure proposes a method for providing, by a BS, a terminal with notification of DMRS configuration information for a CORESET.

The BS may indicate DMRS configuration information (i.e., whether DMRS configuration is DMRS configuration #1 or DMRS configuration #2) for a CORESET, in which downlink control information (DCI) for scheduling of remaining system information (RMSI) can be transmitted, to the terminal via a master information block (MIB). In this example, RMSI may correspond to essential system information (SI), except for a MIB, which is transmitted on a physical broadcast channel (PBCH), and may correspond to, for example, SIB1 and SIB2 in LTE. Alternatively, DMRS configuration information for a CORESET, in which DCI for scheduling of RMSI can be transmitted, may be fixed to DMRS configuration #1.

The BS may provide notification of DMRS configuration information for a CORESET, which can be configured via radio resource control (RRC) signaling, to the terminal via RRC signaling. In this example, configuration of the DMRS configuration information for a CORESET may vary depending on resource mapping schemes for a CORESET. If a CORESET is configured according to an interleaving mapping scheme, the CORESET may be configured as one of DMRS configuration #1 or DMRS configuration #2. If a CORESET is configured according to a non-interleaving mapping scheme, configuration of the CORESET may always be fixed to DMRS configuration #2.

When the BS configures a particular CORESET as DMRS configuration #1 for the terminal, at least one of the following parameters may be additionally configured.

DMRS sequence complying with DMRS configuration #1

Location or offset value within a REG of a DMRS complying with DMRS configuration #1

Transmission periodicity of a DMRS complying with DMRS configuration #1

Slot index (or transmission occasion) for transmission of a DMRS complying with DMRS configuration #1

Time duration in which DMRS configuration #1 is applied

Hereinabove, Embodiment 1 and Embodiment 1-1 have been distinguished and described, but a part of Embodiment 1 and a part of Embodiment 1-1 may be combined and practiced.

Embodiment 2

Embodiment 2 of the disclosure proposes a method for configuring a common search space and a method for monitoring a common search space by a terminal.

A BS may transmit or receive the following common DCI format to/from a terminal in a common search space.

The BS may transmit, to the terminal, DCI for scheduling of a PDSCH for SI, and a corresponding DCI format may be scrambled with an SI-RNTI. The BS may transmit the DCI format, scrambled with the SI-RNTI, to the terminal in a common search space. The common search space, in which the DCI format scrambled with the SI-RNTI is transmitted, will be referred to as "common search space type 1".

The BS may transmit, to the terminal, DCI for scheduling of a PDSCH for a random access response (RAR), and a corresponding DCI format may be scrambled with a RA-RNTI. The BS may transmit the DCI format, scrambled with the RA-RNTI, to the terminal in a common search space. The common search space, in which the DCI format scrambled with the RA-RNTI is transmitted, will be referred to as "common search space type 2".

The BS may transmit, to the terminal, DCI for scheduling of a PDSCH for paging, and a corresponding DCI format may be scrambled with a P-RNTI. The BS may transmit the DCI format, scrambled with the P-RNTI, to the terminal in a common search space. The common search space, in which the DCI format scrambled with the P-RNTI is transmitted, will be referred to as "common search space type 3".

The BS may transmit, to the terminal, particular DCI for pre-emption indication, and a corresponding DCI format may be scrambled with an INT-RNTI. The BS may transmit the DCI format, scrambled with the INT-RNTI, to the terminal in a common search space. The common search space, in which the DCI format scrambled with the INT-RNTI is transmitted, will be referred to as "common search space type 4".

The BS may transmit, to the terminal, DCI including a slot format indicator (SFI), and a corresponding DCI format may be scrambled with a particular RNTI, or may have a size distinguished from that of another DCI format. The BS may transmit an SFI to the terminal in a common search space. The common search space, in which the SFI is transmitted, will be referred to as "common search space type 5".

Hereinafter, various methods for transmitting or receiving the above-described common search space and common DCI format will be described.

[Method 1]

For a terminal before an RRC connection, a BS may configure a CORESET for monitoring of common search space type 1 for the corresponding terminal via a MIB.

For the terminal before an RRC connection, the BS may configure a CORESET for monitoring of common search space type 2 for the terminal via RMSI, more specifically, random access configuration.

For the terminal before an RRC connection, the BS may configure a CORESET for monitoring of common search space type 3 for the terminal via RMSI, more specifically, paging configuration.

The CORESET for monitoring of common search space type 1, the CORESET for monitoring of common search space type 2, and the CORESET for monitoring of common search space type 3 may all be the same CORESET. That is, the CORESET configured via a MIB and the CORESET configured via RMSI may all correspond to the same CORESET. In this example, the same CORESET may imply that not only time and frequency resources but also other pieces of configuration information (e.g., all or some pieces of information among the pieces of configuration information described in Table 2) are all the same.

In this example, common search space type 1, common search space type 2, and common search space type 3 may all be defined to be the same common search space. That is, the BS may transmit all of a DCI format configured with an SI-RNTI, a DCI format configured with a RA-RNTI, and a DCI format configured with a P-RNTI to the terminal on the same common search space in the same CORESET. The terminal may monitor one common search space, and thus may receive all of a DCI format configured with an SI-RNTI, a DCI format configured with a RA-RNTI, and a DCI format configured with a P-RNTI.

Alternatively, common search space type 1, common search space type 2, and common search space type 3 may be defined to be different common search spaces. For example, the respective common search spaces may be defined to be search spaces having offsets different according to the types. Specifically, common search space type 1 may have a CCE index X within a CORESET as a start point, common search space type 2 may have a CCE index Y within a CORESET as a start point, and common search space type 3 may have a CCE index Z within a CORESET as a start point. A CCE start index may use a fixed value predefined for each common search space type, or may be configured via a MIB, RMSI, or the like. The terminal may monitor common search space type 1 so as to receive a DCI format scrambled with an SI-RNTI, may monitor common search space type 2 so as to receive a DCI format scrambled with a RA-RNTI, and may monitor common search space type 3 so as to receive a DCI format scrambled with a P-RNTI.

Common DCI formats of different types are transmitted in the same CORESET by using method 1, and thus a configuration signaling overhead of an additional CORESET can be minimized. Further, the DCI formats are transmitted in the same common search space, and thus the number of times of blind-decoding of the terminal can be efficiently reduced.

[Method 2]

For a terminal before an RRC connection, all of the CORESET for monitoring of common search space type 1, the CORESET for monitoring of common search space type 2, and the CORESET for monitoring of common search space type 3 may correspond to different CORESETs. That is, the CORESET configured via a MIB and the CORESET configured via RMSI may imply that the CORESET configured via a MIB and the CORESET configured via RMSI are configured in different time and frequency resources or other pieces of configuration information (e.g., all or some pieces of information among the pieces of configuration information described in Table 2) are different.

In this example, common search space type 1, common search space type 2, and common search space type 3 may all be defined to be the same common search space. The definition of common search space type 1, common search space type 2, and common search space type 3 as the same common search space implies that a search space is defined at a predefined fixed position in a CORESET. That is, the BS may transmit each of a DCI format scrambled with an SI-RNTI, a DCI format scrambled with a RA-RNTI, and a DCI format scrambled with a P-RNTI to the terminal on a common search space defined by the same rule in a configured CORESET. The terminal may monitor and receive a DCI format scrambled with an SI-RNTI, a DCI format scrambled with a RA-RNTI, and a DCI format scrambled with a P-RNTI in common search spaces defined for CORESETs configured according to the respective common search space types. If a CORESET configured via a MIB and a CORESET configured via RMSI are identical, search spaces are identical by default.

Alternatively, common search space type 1, common search space type 2, and common search space type 3 may be defined to be different common search spaces. For example, the respective common search spaces may be defined to be search spaces having offsets different according to the types. The terminal may monitor common search space type 1 in a CORESET configured via a MIB so as to receive a DCI format scrambled with an SI-RNTI, may monitor common search space type 2 in a CORESET configured via RMSI so as to receive a DCI format scrambled with a RA-RNTI, and may monitor common search space type 3 in a CORESET configured via RMSI so as to receive a DCI format scrambled with a P-RNTI.

Method 2 enables the BS to more flexibly operate transmission of the common DCI. For example, when a very large number of terminals are in an initial access stage in a system, the terminals are offloaded to a particular sub-bandwidth of a system bandwidth, and thus the system can be operated so that initial access of the terminals may be more flexibly performed.

[Method 3]

For an RRC-connected terminal, a BS may configure a CORESET for the corresponding terminal via RRC signaling. Further, the BS may configure a type of a search space, which needs to be monitored in a corresponding CORESET, for the terminal. For example, for a particular CORESET, the BS may configure: a common search space (the above-described common search space type 1, common search space type 2, common search space type 3, common search space type 4, or common search space type 5); a UE-specific search space; or both the common search space and the UE-specific search space.

The BS may configure a particular CORESET for the terminal via RRC signaling, and may configure a type of a common search space which needs to be monitored in the corresponding CORESET. In this configuration, a CORESET and a common search space configured via RRC may be configured separately from a CORESET configured via a MIB or RMSI in an initial access stage as described above in method 1 and method 2. In this example, the terminal no longer monitors a common search space in the CORESET (the CORESET configured via the MIB or RMSI) configured in the initial access stage (before an RRC connection), and may monitor a common search space of the CORESET configured by the BS via the RRC signaling.

A more specific description will be made below.

The BS before an RRC connection may configure CORESET A for monitoring of common search space type X for the terminal via a MIB or RMSI. The BS after the RRC connection may configure CORESET B for monitoring of common search space type X for the terminal via RRC signaling. If CORESET A is different from CORESET B, the terminal no longer monitors common search space type X in CORESET A, and may monitor common search space type X in CORESET B newly configured via RRC signaling. That is, the terminal may be configured to monitor common search space type X via RRC signaling.

[Method 4]

A BS may configure one or more BWPs for a terminal. The BS may configure at least one basic BWP (or identically, a default BWP or a primary BWP) for the terminal, and the basic BWP may be used for the purpose of a fallback operation of the terminal. As an example, BWP #1 and BWP #2 may be configured for the terminal by the BS, and BWP #1 may be configured as a basic BWP. Under the instruction of the BS, the terminal may activate BWP #2, and may perform transmission/reception in BWP #2. If additional DCI is not received after elapse of a particular predefined time, the terminal automatically may activate BWP #1, which is a basic BWP, and may perform transmission/reception in BWP #1.

The BS may configure CORESETs according to the respective BWPs for the terminal. Further, the BS may configure a common search space or a UE-specific search space for the configured CORESET.

The BS may configure at least one UE-specific search space so as to exist in each BWP configured for the terminal. That is, when one or more CORESETs are configured in each BWP, the BS may configure at least one CORESET so as to necessarily include a UE-specific search space. That is, the terminal may monitor at least one UE-specific search space in all BWPs.

The BS may configure each BWP configured for the terminal so as to include at least one common search space, or may configure only a particular BWP so as to include a common search space. This configuration may vary depending on a common search space type.

For example, the above-described common search space type 1, common search space type 2, and common search space type 3 may be configured to exist in a particular BWP (e.g., the above-described basic BWP) among the BWPs configured for the terminal. That is, the terminal may monitor common search space type 1, common search space type 2, and common search space type 3 in the particular BWP. Since: each of common search space type 1 (a purpose of SI reception), common search space type 2 (a purpose of random access), and common search space type 3 (a purpose of paging) is not used to transmit or receive DL/UL data by the terminal but corresponds to a common search space for transmission of DL control information used for another purpose; and configuration of each of the three common search space types in all the BWPs configured for the terminal is likely to be inefficient, it may be desirable to configure each of the three common search space types for the particular BWP.

For example, the above-described common search space type 4 and common search space type 5 may be configured to exist in all the BWPs configured for the terminal. That is, the terminal may monitor common search space type 4 and common search space type 5 in all the configured BWPs. Since each of common search space type 4 (a purpose of pre-emption indication) and common search space type 5 (a purpose of slot format indication) corresponds to a common search space in which an indicator necessary for the terminal to transmit or receive DL/UL data can be transmitted, it may be desirable to configure each of the two common search space types for all the BWPs.

[Method 5]

A BS may configure at least one common search space so as to exist in each of a primary cell and a secondary cell configured for a terminal, or may configure a common search space so as to exist only in the primary cell. This configuration may vary depending on a common search space type.

For example, the above-described common search space type 1, common search space type 2, and common search space type 3 may be configured to exist only in the primary cell configured for the terminal. That is, the terminal may monitor common search space type 1, common search space type 2, and common search space type 3 in the primary cell. Since each of common search space type 1 (a purpose of SI reception), common search space type 2 (a purpose of random access), and common search space type 3 (a purpose of paging) is not used to transmit or receive DL/UL data by the terminal but corresponds to a common search space for transmission of DL control information used for another purpose, it may be desirable for the terminal to monitor common search space type 1, common search space type 2, and common search space type 3 only in the primary cell.

For example, the above-described common search space type 4 and common search space type 5 may be configured to exist in not only the primary cell but also the secondary cell, all of which are configured for the terminal. That is, the terminal may monitor common search space type 4 and common search space type 5 in all of the configured primary cell and secondary cell. Since each of common search space type 4 (a purpose of pre-emption indication) and common search space type 5 (a purpose of slot format indication) corresponds to a common search space in which an indicator necessary for the terminal to transmit or receive DL/UL data can be transmitted, it may be desirable to configure common search space type 4 and common search space type 5 for all of the primary cell and the secondary cell.

Hereinabove, method 1, method 2, method 3, method 4, and method 5 have been separately described, but some of method 1, method 2, method 3, method 4, and method 5 may be combined and practiced.

Hereinabove, Embodiment 1 and Embodiment 2 have been separately described for convenience of description, but some of operations of Embodiment 1 and Embodiment 2 may be combined and practiced.

Figure 8:
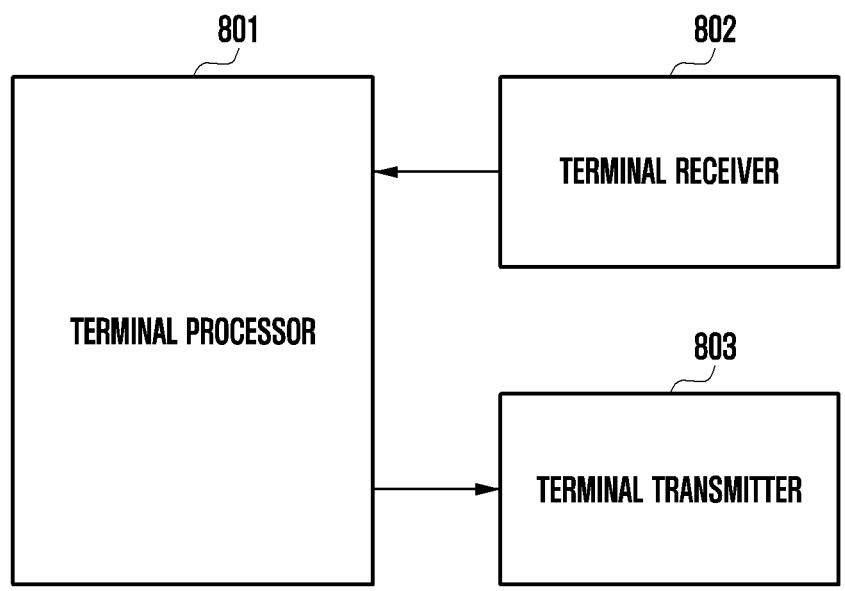
FIG. 8 is a block diagram illustrating a configuration of a terminal according to various embodiments of the disclosure.
Figure 9:
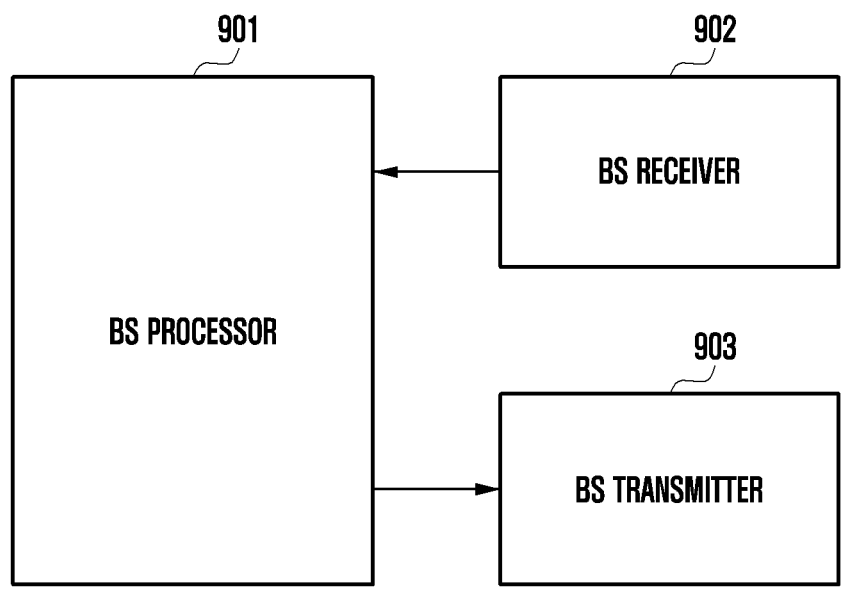
FIG. 9 is a block diagram illustrating a configuration of a base station according to various embodiments of the disclosure.

FIG. 8 illustrates a terminal including a transmitter, a receiver, and a controller which are configured to perform the above-described embodiments of the disclosure. FIG. 9 illustrates a BS including a transmitter, a receiver, and a controller which are configured to perform the above-described embodiments of the disclosure. A transmission/reception method performed by each of the BS and the terminal is implemented to apply a method for transmitting or receiving a DL control channel and a DL data channel to a 5G communication system according to the above-described embodiments. In order to perform the transmission/reception methods, each of the transmitter, the receiver, and the processor of the terminal, and each of the transmitter, the receiver, and the processor of the BS need to operate according to the embodiments.

Specifically, FIG. 8 is a block diagram illustrating a configuration of a terminal according to embodiments of the disclosure.

As illustrated in FIG. 8, the terminal according to the disclosure may include a terminal processor 801 a terminal receiver 802, and a terminal transmitter 803.

The terminal processor 801 may be configured to control a series of processes so that the terminal can operate according to the above-described embodiments of the disclosure. For example, the terminal processor 801 may be configured to differently control a method for blind-decoding a DL control channel, a method for measuring an RLM, and the like according to embodiments of the disclosure. In embodiments of the disclosure, the terminal receiver 802 and the terminal transmitter 803 may be collectively referred to as a "transceiver". The transceiver may be configured to transmit or receive a signal to or from a BS. The signal may include control information and data. To this end, the transceiver may include an RF transmitter configured to up-convert a frequency of the transmitted signal and amplify a signal having the up-converted frequency, an RF receiver configured to low-noise-amplify the received signal and down-convert the frequency, and the like. Further, the transceiver may be configured to receive a signal via a radio channel and output the received signal to the terminal processor 801, and may be configured to transmit a signal output from the terminal processor 801 via a radio channel. The processor 801 may be configured to control the transceiver. The processor may include at least one processor, and may be referred to as a "controller".

The terminal processor 801 may control to: receive, from the BS, first CORESET configuration information including first DMRS configuration information for a first CORESET; receive, from the BS, second CORESET configuration information including second DMRS configuration information for a second CORESET; identify a third CORESET, in which the first CORESET and the second CORESET overlap each other, based on the first CORESET configuration information and the second CORESET configuration information; and receive a DMRS based on the first DMRS configuration information in the first CORESET including the third CORESET. When the second CORESET is decoded, the terminal processor 801 may assume that a DMRS, which is based on the second DMRS configuration information, is not allocated to the second CORESET including the third CORESET. The first DMRS configuration information may correspond to a configuration of transmission of a DMRS in an entire band of the first CORESET, and the second DMRS configuration information may correspond to a configuration in which, in the second CORESET, a DMRS is transmitted only on a region for transmission of control information. Further, the terminal processor 801 may control to: perform blind-decoding based on a DMRS depending on the first DMRS configuration information in the first CORESET including the third CORESET; and perform blind-decoding based on a DMRS depending on the second DMRS configuration information in the second CORESET except for the third CORESET.

FIG. 9 is a block diagram illustrating a configuration of a BS according to embodiments of the disclosure.

As illustrated in FIG. 9, the BS according to the disclosure may include a BS processor 901, a BS receiver 902, and a BS transmitter 903.

The BS processor 901 may be configured to control a series of processes so that the BS can operate according to the above-described embodiments of the disclosure. For example, the BS processor 901 may be configured to differently control a method for transmitting and configuring a DL control channel a DMRS, a method for configuring an RLM-RS and a threshold, and the like according to embodiments of the disclosure. In embodiments of the disclosure, the BS receiver 902 and the BS transmitter 903 may be collectively referred to as a "transceiver". The transceiver may be configured to transmit or receive a signal to or from the terminal. The signal may include control information and data. To this end, the transceiver may include an RF transmitter configured to up-convert a frequency of the transmitted signal and amplify a signal having the up-converted frequency, an RF receiver configured to low-noise-amplify the received signal and down-convert the frequency, and the like. Further, the transceiver may be configured to receive a signal via a radio channel and output the received signal to the BS processor 901, and may be configured to transmit a signal output from the BS processor 901 via a radio channel. The processor 901 may be configured to control the transceiver. The processor 901 may include at least one processor, and may be referred to as a "controller".

The BS processor 901 may control to: transmit first CORESET configuration information including first DMRS configuration information for a first CORESET; transmit second CORESET configuration information including second DMRS configuration information for a second CORESET; identify a third CORESET in which the first CORESET and the second CORESET overlap each other; and transmit a DMRS based on the first DMRS configuration information in the first CORESET including the third CORESET. Further, the BS processor 901 may control not to allocate a DMRS, which is based on the second DMRS configuration information, to the second CORESET including the third CORESET. Further, the BS processor 901 may control to: transmit control information, to which a precoding identical to that applied to a DMRS depending on the first DMRS configuration information is applied, in the first CORESET including the third CORESET; and transmit control information, to which a precoding identical to that applied to a DMRS depending on the second DMRS configuration information is applied, in the second CORESET except for the third CORESET. The first DMRS configuration information may correspond to a configuration of transmission of a DMRS in an entire band of the first CORESET, and the second DMRS configuration information may correspond to a configuration in which, in the second CORESET, a DMRS is transmitted only on a region for transmission of control information.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. An operating method of a base station, the operating method comprising:
    transmitting first control resource set configuration information including first demodulation reference signal (DMRS) configuration information for a first control resource set;
    transmitting second control resource set configuration information including second DMRS configuration information for a second control resource set;
    identifying a third control resource set in which the first control resource set and the second control resource set overlap each other; and
    transmitting a DMRS based on the first DMRS configuration information in the first control resource set including the third control resource set,
    wherein the first DMRS configuration information corresponds to a configuration of transmission of a wideband DMRS for the first control resource set, and
    wherein the second DMRS configuration information corresponds to a configuration in which, in the second control resource set, a narrowband DMRS is transmitted only on a region for transmission of control information.

2. The operating method of claim 1, wherein a DMRS, which is based on the second DMRS configuration information, is not allocated to the second control resource set including the third control resource set.

3. The operating method of claim 1, further comprising:
    transmitting control information, to which a precoding identical to a precoding applied to a DMRS depending on the first DMRS configuration information is applied, in the first control resource set including the third control resource set; and
    transmitting control information, to which a precoding identical to a precoding applied to a DMRS depending on the second DMRS configuration information is applied, in the second control resource set except for the third control resource set.

4. An operating method of a terminal, the operating method comprising:
    receiving, from a base station, first control resource set configuration information including first demodulation reference signal (DMRS) configuration information for a first control resource set;
    receiving, from the base station, second control resource set configuration information including second DMRS configuration information for a second control resource set;
    identifying a third control resource set, in which the first control resource set and the second control resource set overlap each other, based on the first control resource set configuration information and the second control resource set configuration information; and
    receiving a DMRS based on the first DMRS configuration information in the first control resource set including the third control resource set,
    wherein the first DMRS configuration information corresponds to a configuration of transmission of a wideband DMRS for the first control resource set, and
    wherein the second DMRS configuration information corresponds to a configuration in which, in the second control resource set, a narrowband DMRS is transmitted only on a region for transmission of control information.

5. The operating method of claim 4, further comprising, in case that the second control resource set is decoded, assuming that a DMRS, which is based on the second DMRS configuration information, is not allocated to the second control resource set including the third control resource set.

6. The operating method of claim 4, further comprising:
    performing blind-decoding based on a DMRS depending on the first DMRS configuration information in the first control resource set including the third control resource set; and
    performing blind-decoding based on a DMRS depending on the second DMRS configuration information in the second control resource set except for the third control resource set.

7. A base station comprising:
    a transceiver configured to transmit and receive signals; and
    a controller configured to control to:
        transmit first control resource set configuration information including first demodulation reference signal (DMRS) configuration information for a first control resource set,
        transmit second control resource set configuration information including second DMRS configuration information for a second control resource set,
        identify a third control resource set in which the first control resource set and the second control resource set overlap each other, and
        transmit a DMRS based on the first DMRS configuration information in the first control resource set including the third control resource set,
    wherein the first DMRS configuration information corresponds to a configuration of transmission of a wideband DMRS for the first control resource set, and
    wherein the second DMRS configuration information corresponds to a configuration in which, in the second control resource set, a narrowband DMRS is transmitted only on a region for transmission of control information.

8. The base station of claim 7, wherein a DMRS, which is based on the second DMRS configuration information, is not allocated to the second control resource set including the third control resource set.

9. The base station of claim 7, wherein the controller is further configured to control to:
    transmit control information, to which a precoding identical to a precoding applied to a DMRS depending on the first DMRS configuration information is applied, in the first control resource set including the third control resource set; and
    transmit control information, to which a precoding identical to a precoding applied to a DMRS depending on the second DMRS configuration information is applied, in the second control resource set except for the third control resource set.

10. A terminal comprising:
    a transceiver configured to transmit and receive signals; and
    a controller configured to control to:
        receive, from a base station, first control resource set configuration information including first demodulation reference signal (DMRS) configuration information for a first control resource set, receive, from the base station, second control resource set configuration information including second DMRS configuration information for a second control resource set, identify a third control resource set, in which the first control resource set and the second control resource set overlap each other, based on the first control resource set configuration information and the second control resource set configuration information, and receive a DMRS based on the first DMRS configuration information in the first control resource set including the third control resource set, wherein the first DMRS configuration information corresponds to a configuration of transmission of a wideband DMRS for the first control resource set, and wherein the second DMRS configuration information corresponds to a configuration in which, in the second control resource set, a narrowband DMRS is transmitted only on a region for transmission of control information.

11. The terminal of claim 10, wherein the controller is further configured to control to:

perform blind-decoding based on a DMRS depending on the first DMRS configuration information in the first control resource set including the third control resource set, and perform blind-decoding based on a DMRS depending on the second DMRS configuration information in the second control resource set except for the third control resource set.

12. The terminal of claim 10, wherein the controller is further configured to control to, in case that the second control resource set is decoded, assuming that a DMRS, which is based on the second DMRS configuration information, is not allocated to the second control resource set including the third control resource set.

* * * * *